United States Patent Office 3,089,247
Patented May 14, 1963

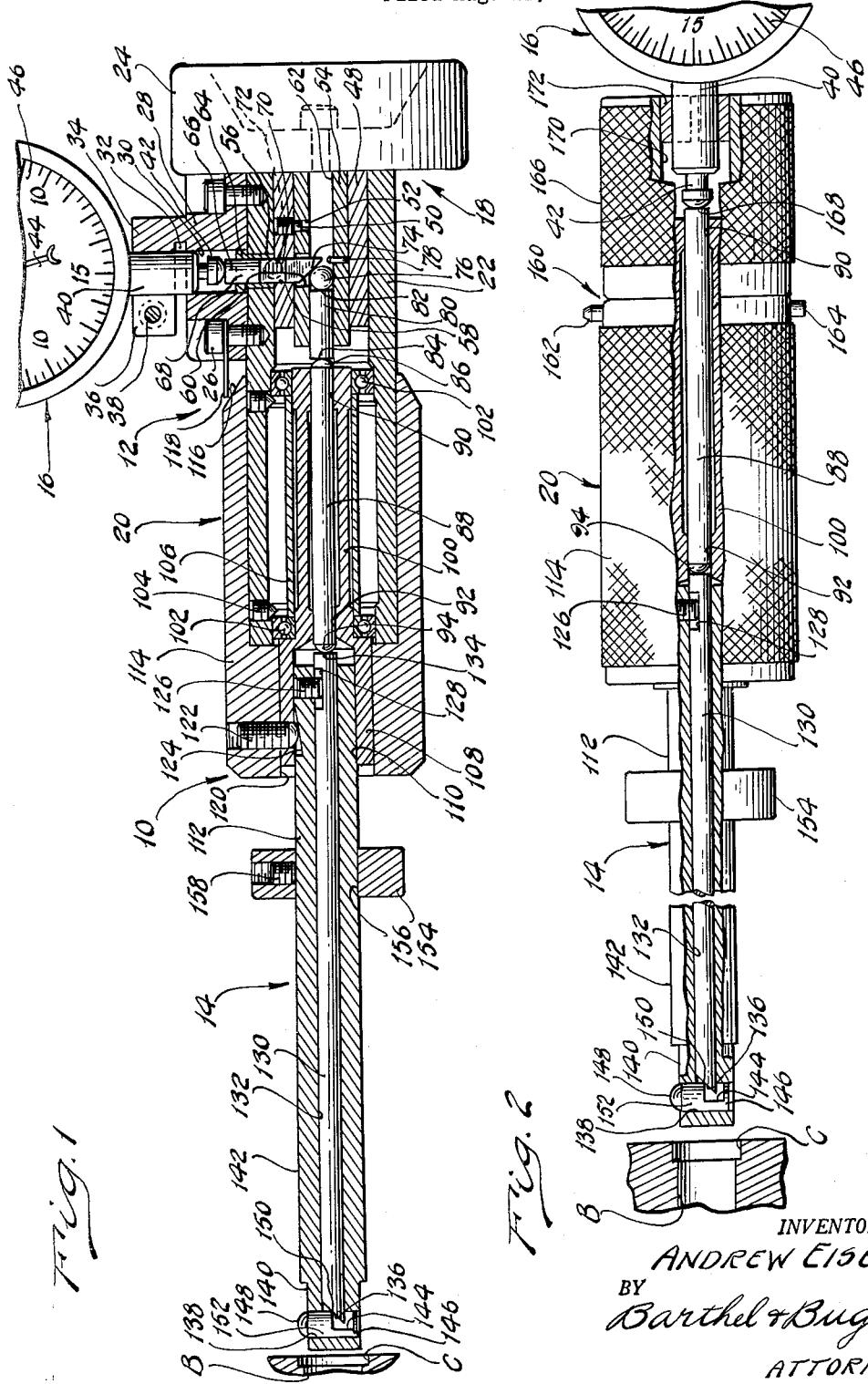

3,089,247
BORE CONCENTRICITY GAUGE
Andrew Eisele, 15025 Cheyenne Ave., Detroit, Mich.
Filed Aug. 21, 1959, Ser. No. 835,312
4 Claims. (Cl. 33—174)

This invention relates to gauges and, in particular, to bore concentricity gauges.

One object of this invention is to provide a dial indicator bore concentricity gauge having improved means for converting the transverse motion of the measuring or feeler pin to longitudinal motion of a motion-transmitting rod which in turn transmits this motion to a dial indicator upon the graduated dial of which either the precise diameter of the bore is indicated, or the departure or variation of the diameter from an intended diameter.

Another object is to provide a dial indicator bore concentricity gauge of the foregoing character which is especially adapted to indicate the variation in concentricity or axial misalignment of one bore relatively to another bore by the fluctuations of the needle of the dial indicator on its graduated scale.

Another object is to provide a dial indicator bore concentricity gauge of the foregoing character which possesses a greatly enhanced range of measurement as compared with prior bore gauges or concentricity gauges, because of the construction of the mechanism for converting the transverse motion of the measuring or feeler pin to the longitudinal motion of the motion-transmitting rod, and thence to the plunger of the dial indicator.

Other objects and advantages of the invention will become apparent during the course of the following description of the accompanying drawing, wherein:

FIGURE 1 is a central longitudinal section through a bore concentricity gauge according to one form of the invention, with the stationary handle shown in side elevation; and FIGURE 2 is a side elevation, partly in central vertical section, of a modification of the bore gauge shown in FIGURE 1.

Referring to the drawing in detail, FIGURE 1 shows a bore concentricity gauge, generally designated 10, according to one form of the invention as consisting generally of a dial indicator carrier 12 in which any one of a series of bore concentricity or alignment measuring units 14 is interchangeably mounted. The bore measuring units 14 are supplied in a set covering a range of diameters much greater than the range capable of being covered by a single measuring unit 14, thereby not only greatly increasing the range of the instrument but also reducing its cost as compared with the cost of the several separate bore gauges which would otherwise be required. A conventional dial indicator, generally designated 16, is mounted in the dial indicator carrier 12 and registers departures from concentricity of one bore relatively to another bore, as described below.

The dial indicator carrier 12 includes a stationary first or handle structure, generally designated 18, upon which is rotatably mounted a second or rotary handle structure, generally designated 20, the latter receiving the interchangeable bore measuring units 14. The stationary handle structure 18 consists of a sleeve or stationary support 22 to the rearward end of which is connected a circular or cylindrical stationary handle 24 by screws or other suitable fasteners (not shown). Mounted on the rearward end portion of the sleeve 22 and secured thereto by screws 26 threaded therein is a dial indicator holding bracket 28 having a central bore 30 which is intersected by a transverse slot 32. Above the slot 32 is a clamping portion 34 of the bracket through which the bore 30 also extends and which is split by a slot 36 to provide a clamping action brought about by a clamping screw 38 upon the stem 40 of the dial indicator 16. The latter contains the usual dial indicator plunger 42 which is connected by conventional motion-transmitting mechanism (not shown) to the rotary needle 44 which registers with the graduated dial 46 of the dial indicator 16. The dial indicator 16 is conventional and its details are beyond the scope of the present invention, and such dial indicators are readily available on the open market.

Mounted inside the sleeve 22 is an intermediate bushing 48 which is bored and threaded transversely to receive a set screw 50 which engages in a transverse hole 52 in an inner bushing 54 to tie the bushings 48 and 54 together. The sleeve 22 and bushings 48 and 54 are provided with aligned coaxial transvere bores 56, 58 and 60 respectively, the latter opening into a longitudinal bore 62 in the inner bushing 54. Mounted in the bores 30 and 56 is a flanged bearing bushing 64 in which the cylindrical upper portion 66 of a transverse motion-transmitting plunger 68 is reciprocably mounted. The lower portion of the plunger 68 is flat-sided as at 70 so as to be prevented from rotating within its bores 56 and 58 by a set screw 72. The hole 60 is merely a clearance hole through which the lower end portion of the plunger 68 loosely passes. The lower end of the plunger 68 is provided with a flat inclined surface 74 which is accurately machined, as by grinding, at an angle of 45 degrees to the axis of the plunger 68. The plunger 68 and the bores in which it is reciprocably mounted are in turn disposed perpendicular to the axis of the bore 62 in the inner bushing 54.

Rollable along the bore 62 and engageable with the inclined flat surface 74 of the transverse motion-transmitting plunger 68 is a hardened precision ball 76 of substantially the same diameter as the bore 62 with sufficient clearance to be rollable therealong. The bushing 54 is drilled transversely to receive a stop pin 78 for preventing excessive travel of the ball 76 along the bore 62. Also reciprocable within the bore 62 and snugly but slidably mounted therein is a final longitudinal motion-transmitting rod 80, the flat rearward end 82 of which engages the ball 76.

The flat forward end 84 of the final motion-transmitting rod 80 is engaged by the rounded rearward end 86 of an intermediate longitudinal motion-transmitting rod 88 which is snugly but reciprocably mounted in aligned bores 90 and 92 within a rotary bushing 100. The rod 88 has a rounded forward end 94. The bushing 100 is rotatably mounted by means of spaced anti-friction bearing units 102 in the forward end of the sleeve 22 and held in position by set screws 104 and a spacer tube 106. The rotary bushing 100 has an enlarged forward end 108 containing a socket bore 110 for receiving the rearward end of the stem 112 of the measuring unit 14.

Rotatably mounted upon the forward portion of the sleeve 22 is a tubular knurled rotary handle 114, the rearward end 116 of which is beveled and graduated for registry with a pointer 118 mounted on the forward screw 26. The forward end portion of the rotary tubular handle 114 has a reduced-diameter longitudinal bore 120 which engages the enlarged forward end 108 of the rotary bushing 100. The tubular handle 114 and bushing end 108 are drilled transversely in alignment and threaded to receive a headless set screw 122, the inner end of which engages an inclined shallow flat recess 124 in the rearward end of the stem 112. The rotary bushing 100, stem 112 and rotary handle 114 collectively form a rotary elongated hollow support.

The rearward end of the stem 112 is drilled and threaded transversely to receive a headless stop screw 126 which registers with a longitudinal recess 128 in an elongated forward motion-transmitting rod 130. The rod 130 is snugly but reciprocably mounted in a longitudinal bore 132 within the stem 112, and has a flat rearward end 134 engageable with the rounded forward end 94 of the intermediate motion-transmitting rod 88. The forward end of the forward motion-transmitting rod 130 is provided with an accurately-machined inclined end surface 136 which is precisely disposed at an angle of 45 degrees to the longitudinal axis of the forward motion-transmitting rod 130, as by precision grinding and extends substantially entirely across the rod 130 from side to side thereof. This doubles the range of the instrument, as contrasted with those having motion-transmitting rods with V-shaped or conical tips, by enabling the measuring pin edge 150 to travel twice as far across the end surface 136.

The longitudinal bore 132 opens into a transverse bore 138 in the reduced diameter forward end portion 140 which is adapted to fit the bore B the concentricity of which is to be gauged relatively to the bore C snugly but slidably engaged by the cylindrical main or pilot surface 142 of the stem 112. The inclined forward end surface 136 of the rod 130 also extends into the transverse bore 138 and projects into a notch 144 in one side of a measuring pin or feeler 146 snugly but reciprocably mounted within the transverse bore 138 and having a rounded end 148 engageable with the bore C. The measuring pin 146 at the end of the notch 144 nearest the rounded end 148 has a sharp edge 150 which engages the inclined surface 136 in a point contact because of its arcuate configuration resulting from the geometry of the cylindrical external surface 152 of the measuring pin 146.

An annular stop collar 154 centrally bored as at 156 to slidably engage the external surface 142 of the stem 112 enables the location of the depth of measurement within the bores B and C to be acurately predetermined, so that it will be known at what level the measuring pin end 148 engages the bore C. The stop collar 154 is drilled and threaded transversely to receive a headless locking screw 158 by which the stop collar 154 is locked in any desired position of adjustment along the stem 112.

The modified dial indicator bore concentricity gauge, generally designated 160, shown in FIGURE 2 is in most respects similar to the bore gauge 10 of FIGURE 1 and corresponding parts are accordingly designated with the same reference numerals. The forward or left-hand end of the bore gauge 160 is substantially identical with that of the bore gauge 10 and the differences in construction reside in the reaward or right-hand end thereof. The The rotary handle structure 20 also remains unchanged except that an indicator pointer pin 162 is mounted on its rearward end and opposed by a blunt pin 164. The axes of the pins 162 and 164 are parallel to the axis of the measuring pin or feeler 146 within the measuring unit 14.

In the modified bore concentricity gauge 160, the intermediate longitudinal motion-transmitting rod 88 is extended into the stationary handle 166 which replaces the handle 24 and dial indicator holding bracket 28 of FIGURE 1. The stationary handle 166 like the rotary handle 114 is approximately cylindrical and knurled for convenience of grasping. The rotary bushing 100 also is elongated so as to extend into the interior of the stationary handle 166, along with the longitudinal motion-transmitting rod 88, the rearward end 168 of which is now flat, rather than rounded. The stationary handle 166 contains a central bore 170 in which is inserted a split ring 172 which snugly and clampingly engages the stem 40 of the dial indicator 16 so as to hold the dial indicator plunger 42 substantially coaxial with the motion-transmitting rods 130 and 88. Thus, the main difference in the modified bore gauge 160 from the bore gauge 10 resides in the fact that the stem 40 of the dial indicator 16 is disposed coaxial with the remainder of the instrument rather than transverse to it.

In the operation of the invention in either form, namely the bore concentricity gauge 10 or the bore concentricity gauge 160, the proper measuring unit 14 for the particular diameter of bore to be gauged is inserted in the socket bore 110 of the rotary sleeve enlargement 108 and clamped in position by means of the set screw 122 against the inclined flat surface 124. The stop collar 154 is also clamped in its proper position on the stem 112 at the desired distance from the measuring pin or feeler pin 146 to regulate the depth at which measurement is to take place.

The operator then grasps the rotary handle 114 in one hand and the stationary handle 24 or 166 in the other hand while he inserts the reduced diameter portion 140 and after it the enlarged diameter portion 142 into the bore C, and pushes the stem 112 into the bore C until the reduced diameter portion 140 enters the reduced diameter bore B. At this point, the collar 154 will halt further insertion of the stem 112. The operater then rotates the rotary handle 114 while he holds the stationary handle 24 or 166 stationary, causing the stem 112 to rotate within the bores B and C. The consequent tracing out of the bore B while the pilot surface 142 engages the bore C measures the concentricity of the bore B relatively to the bore C. If there is no departure from concentricity, the measuring pin 146 remains stationary and no motion occurs in the forward motion-transmitting rod 130.

If, however, there is a departure from concentricity of the bore B relatively to the bore C, the measuring pin or feeler pin 146 moves transversely within the transverse bore 138. The consequent transverse travel of the sharp edge 150 causes it to push against the flat inclined forward end surface 136 of the forward motion-transmitting rod 130, moving the latter longitudinally within the stem bore 132, while rotation of the rod 130 within the stem 112 is prevented by the set screw 126 within the notch 128.

In the operation of the bore concentricity gauge 10, the longitudinal motion of the forward motion-transmitting rod 130 is transmitted through the intermediate motion-transmitting rod 88 and the final motion-transmitting rod 180 to the ball 76 which is thereby pushed against the inclined flat inner end surface 74 of the transverse motion-transmitting plunger 68, causing the latter to move transversely and actuate the dial indicator plunger 42. This in turn causes a swinging motion of the dial indicator needle 44 which indicates upon the graduated scale 46 the departure from concentricity of the bore C relatively to the bore B.

In the operation of the modified bore concentricity gauge 160, the rearward end 168 of the intermediate motion-transmitting rod 88 directly engages the dial indicator plunger 42 and causes motion of the needle 44 relatively to the graduated dial scale 46, as described above. In either case, the location of the irregularity or part of maximum departure from concentricity is indicated, in the bore gauge 10 by the position of the beveled graduated surface 116 under the pointer 118, and in the bore gauge 160 by the position of the pointer pin 162.

In either form of the invention, it will be self-evident from the geometrical relationship between the sharp edge 150 and the inclined surface 136 which it engages that such engagement during operation causes the sharp edge 150 to exert a scraping action which scrapes off the surface 136 any dirt particles which have collected thereon. This scraping action prevents the accuracy of the bore gauge 10 or 160 from being impaired by the presence of such dirt.

What I claim is:

1. A bore concentricity gauge for measuring the concentricity of a pair of intendedly concentric bores, said gauge comprising a stationary handle structure including a stationary elongated hollow support having a first handle in the rearward portion thereof, a dial indicator having a stem mounted in said stationary handle structure and having an operating plunger reciprocably mounted within said stem; a rotary handle structure including a rotary elongated hollow support rotatably mounted relatively to said stationary handle structure and having a longitudinal bore communicating with said dial indicator operating plunger, said rotary support having a pilot surface thereon adapted to slidably engage the surface of one of the bores to be gauged and having a transverse bore therein disposed remote from said first handle and communicating with said longitudinal bore, a transversely reciprocable measuring member reciprocably mounted in said transverse bore and having opposite ends, said measuring member having a workpiece bore surface-contacting feeler portion thereon adapted to slidably engage the surface of the other bore to be gauged, said measuring member intermediate its opposite ends having a sharp edge thereon, and elongated reciprocable motion-transmitting means reciprocably mounted in said longitudinal bore and having a forward end portion with a forward contact surface inclined obliquely to the longitudinal axis of said motion-transmitting means and having engagement with said measuring member solely at said sharp edge, said motion-transmitting means having a reciprocable rearward part operatively engaging said dial indicator plunger.

2. A bore concentricity gauge, according to claim 1, wherein said sharp edge which engages said inclined forward contact surface is of arcuate configuration effecting point contact with said inclined forward contact surface.

3. A bore concentricity gauge, according to claim 1, wherein said rotary handle structure includes a second handle rotatably mounted on said stationary handle structure and also includes said transverse bore containing said transversely-reciprocable measuring member.

4. A bore concentricity gauge, according to claim 1, wherein said inclined forward contact surface extends substantially entirely across said forward end portion from side to side thereof.

References Cited in the file of this patent

UNITED STATES PATENTS

| | | |
|---|---|---|
| 1,723,529 | Schwieterman | Aug. 6, 1929 |
| 2,702,946 | Boat | Mar. 1, 1955 |
| 2,956,342 | Eisele | Oct. 18, 1960 |
| 3,030,709 | Eisele | Apr. 24, 1962 |

FOREIGN PATENTS

| | | |
|---|---|---|
| 546,900 | Great Britain | Aug. 4, 1942 |
| 253,498 | Switzerland | Nov. 16, 1948 |